United States Patent

[11] 3,538,986

| [72] | Inventor | Olly O. Stoffel<br>4527 Del Mar Ave., San Diego, California 92101 |
|------|----------|---|
| [21] | Appl. No. | 660,389 |
| [22] | Filed | Aug. 14, 1967 |
| [45] | Patented | Nov. 10, 1970 |

[54] VIBRATING RIPPER
14 Claims, 5 Drawing Figs.

[52] U.S. Cl. .................................................. 172/40,
172/699, 172/719
[51] Int. Cl. ........................................................ A01b 35/00
[50] Field of Search ........................................... 172/40;
37/V.D.

[56] References Cited
UNITED STATES PATENTS

| 2,792,769 | 5/1957 | Harshberger ................ | 172/40 |
| 3,386,517 | 6/1968 | Kelley .......................... | 172/40 |
| 1,614,273 | 1/1927 | Brewer ......................... | 172/40 |
| 2,949,871 | 8/1960 | Finn ............................. | 37/98X |
| 3,103,250 | 9/1963 | Lamb ........................... | 172/40 |
| 3,167,134 | 1/1965 | Leo .............................. | 172/40 |
| 3,183,979 | 5/1965 | Rogers ......................... | 172/40 |
| 3,211,236 | 10/1965 | Patton .......................... | 172/40 |
| 3,231,025 | 1/1966 | Bodine ......................... | 172/40 |

FOREIGN PATENTS

| 25,566 | 2/1915 | Norway ........................ | 172/40 |

Primary Examiner—Robert E. Pulfrey
Assistant Examiner—James W. Peterson
Attorney—Carl R. Brown ABSTRACT: This vibrating ripper is moved by a prime mover through material to be ripped and has a support shank rigidly secured to a drawbar means with an operating shank positioned forward of and pivotally connected to the support shank. A vibrating means oscillates the operating shank on the pivotal connection and resilient means spaces the operating shank relative to the support shank.

Patented Nov. 10, 1970

INVENTOR.
OLLY O. STOFFEL
BY Carl R. Brown
attorney

Patented Nov. 10, 1970

INVENTOR.
OLLY O. STOFFEL

BY Carl R. Brown
Attorney

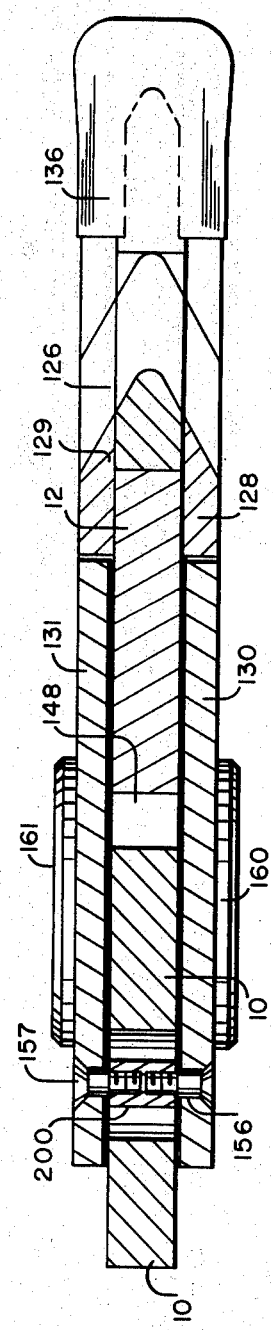
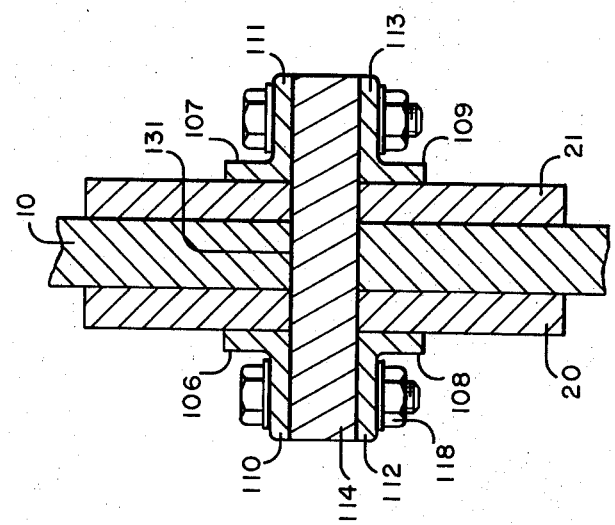

VIBRATING RIPPER

BACKGROUND OF THE INVENTION

The need for deep running subsoilers, plows, and rippers for breaking up, loosening and turning over hard material is well known. However, it is difficult to use plows, rippers, subsoilers, and the like to make deep cuts in hard materials because of the large forces required. While the plows, subsoilers, and rippers can usually be built large and strong enough, this brute force approach is expensive and requires a very large prime mover to move the large plow, ripper, or subsoiler. Further where the material to be plowed or ripped is very hard such as hardpan, concrete, frozen ground or the like, then even the large and very expensive equipments become limited in the depth at which they can penetrate in a single pass through the material.

Vibrating rippers have thus found a useful application in plowing, turning over or breaking up these hard materials. The known vibrating rippers usually employ a vibrating mechanism that is rigidly connected to the drawbar and thus vibrates the entire ripper structure including the connection to the prime mover. This results in an inefficient structure that is prone to failure. Further the vibrator mechanism merely vibrates the ripper blade and does not effectively accomplish a cutting or prying of the material in a manner that facilitates breaking up the material.

Thus there is a pressing need for a vibrating ripper that is able to penetrate deeply into very hard materials, and break it up in an efficient and relatively inexpensive manner. Such a vibrating ripper can be applied economically and effectively in many applications that are presently not able to be accomplished.

SUMMARY OF THE INVENTION

The vibration ripper of my invention has many applications with the primary one being to rip hard materials with relatively deep penetration. In the embodiment, a support shank is rigidly connected to a drawbar that is inturn connected to a variable pitch bracket that is hitched to any known prime movers in the known manner. Positioned between the support shank and the variable pitch bracket is an operating shank that at its lower end has a forward curved surface that forms a point at its lower end. The operating shank has rearwardly projecting side plates that are connected through a unique bearing to the support shank. A vibrating mechanism, preferably secured to the upper end of the operating shank, vibrates the operating shank on the bearing in a vertical direction with a clockwise and counterclockwise oscillatory movement. This causes the forward projecting point of the operating shank to move vertically upward and downward lifting, prying, penetrating and cutting the material that is being ripped.

A first resilient means is positioned between the operating shank and the support shank to resiliently maintain a spacing therebetween during nonoperation and operation. A second resilient means is positioned between the operating shank and the variable pitch bracket for resiliently holding the operating shank in a substantially vertical position for maintaining a given minimum space between the operating shank and the variable pitch bracket. These resilient means are adjustable to maintain the correct spacing both in the operating and nonoperating condition.

The operating shank has removable cutting and ripping plates on its forward surface that may be selectively removed and replaced as desired when worn from repeated use. Also the side plates that are connected to the operating shank function to prevent dirt, soil, material and the like from accumulating in the space between the vibrating operating shank and the support shank.

The vibrating ripper of my invention is not limited to any given amount of power that can be applied to the ripper or its movement. The ability of the ripper to pry up earth and keep it moving toward the surface as the ripper is being pulled forward through the material, assures a fast action and powerful movement underground. This decreases the drawbar pull necessary to move the ripper forward to a much greater extent than in the conventional ripper.

Since one of the advantages of the invention is the ability to provide vibrating force to the operating shank in a manner that does not place extreme stresses on other operational parts of the ripper structure, it should be understood that the unique vibrating mechanism has many applications other than the ripping of hard soil and the like. For example, the vibrating ripper mechanism can also be used to rip ice when mounted on the forward end of a boat or ship, or to tamp and compact soil, or to be used in demolition work, or to accomplish many other vibration jobs, as for example, to crush rock. The vibrating ripper mechanism only has to be mounted in an appropriate apparatus to accomplish the foregoing.

Therefore it is an object of this invention to provide a new and improved resiliently balanced vibrating mechanism.

It is another object of this invention to provide a new and improved vibrating ripper.

It is another object of this invention to provide a new and improved vibrating ripper that is resiliently balanced and does not impart extreme vibrating forces on portions of the structure not able to absorb this vibrating force over extended periods of use.

It is another object of this invention to provide a new and improved vibrating ripper that rips hard soil, concrete, frozen soil, ice and other hard materials in an improved and efficient manner.

It is another object of this invention to provide a new and improved vibrating ripper that may be pulled by relatively small equipment relative to the ripping operation that can be accomplished.

It is another object of this invention to provide a new and improved vibrating ripper wherein the vibrating force is not applied to the drawbar.

It is another object of this invention to provide a new and improved vibrating ripper that has a fast action and powerful movement underground and that decreases the drawbar pull required.

Other objects and advantages of my invention will become more apparent upon a reading of the following detailed description in which like parts are designated by like reference numbers and wherein:

FIG. 4 is a cross-sectional view taken along lines 4-4 of FIG. 1.

FIG. 5 is a cross-sectional view taken along lines 5-5 of FIG. 1.

Figure 1:
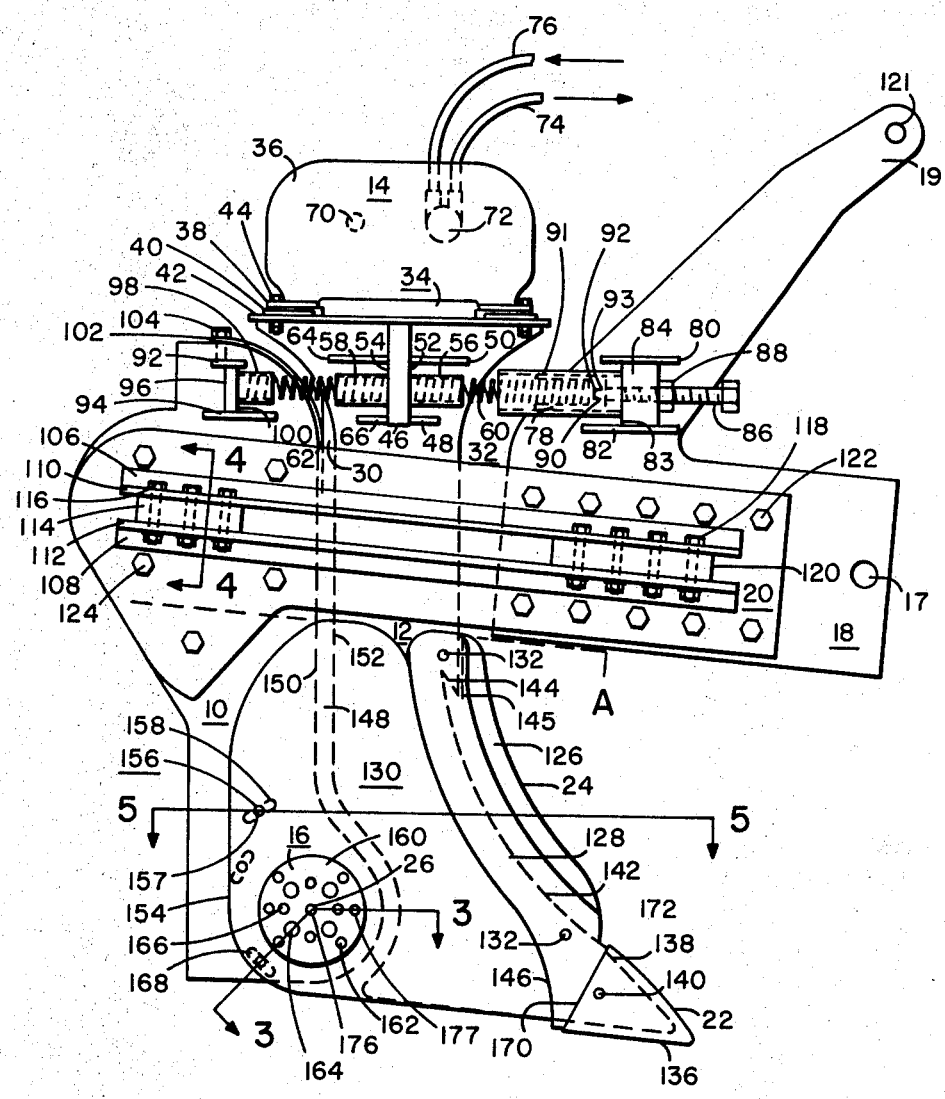
FIG. 1 is a side view of an embodiment of my invention.

Referring now to FIG. 1, there is illustrated an embodiment of the vibrating ripper of my invention that generally comprises a support shank 10 and a working shank 12 that are inner connected by a bearing unit 16. A drawbar 20 is secured to the support shank 10 and is connected at its forward end to a variable pitch bracket that hitches the ripper to a prime mover. A vibrating mechanism 14 positioned on the upper end of the working unit 12 vibrates horizontally to move the upper end of the working shank 12 in a horizontal direction and thereby oscillate and vibrate working surface and the forward cutting and prying edge 24 or the penetrating edge of the working shank in a clockwise and counterclockwise direction around the bearing 16. A resilient means is positioned between the support shank 10 and the working shank 12 to assure a minimum spacing therebetween.

The vibrating ripper is normally pulled by a prime mover of any type or design such as a tractor or caterpillar, by means of a well known connection to the variable pitch bracket. When the vibrating ripper is placed in operation, it is normally buried in the material to be ripped to a point substantially corresponding to the dotted line A illustrated in FIG. 1. The motor is energized in the vibration mechanism 14 and the entire vibrating ripper structure is pulled through the material.

The vibrating power mechanism 14 may comprise a well known vibrating unit that, for example, may be purchased from Seamon Corp., Milwaukee, Wisconsin, and which mechanism provides vibration power in the order of approximately 25,000 pounds per square inch. Of course, it should be recognized that the power of the vibration mechanism is determined by the size of the vibration ripper used and the particular ripping job that the ripper is expected to accomplish. In the illustrative embodiment, the vibration motor is driven by a hydraulic pump 72 supplied with hydraulic fluid under pressure from the prime mover through lines 74 and 76. The pump 72 actuates a vibration motor 70 that causes a horizontal vibrating force relative to the working shank 12. The vibrating mechanism 14 is secured to the upper end of the working member 12 by individual plates 38 at each of the four corners that fit on a raised plate 40 that is secured to an upper plate surface 42 that in turn is secured to the upper surface of the working shank 12. Bolts 44 secure the corners of the vibrating mechanism 14 in position and plates 40 and 42 are normally welded to the working shank 12.

The working shank 12 in the operative and in the nonoperative condition is spaced between support shank 10 by a space 148 and from the variable pitch bracket 18 by a space 32. It is necessary for preferred operation of the unit that these spaces be maintained with variations as will be described in greater detail hereinafter, during operative and nonoperative conditions. To assure this correct spacing, a pair of centering and cushioning springs 60 and 62 are positioned between the respective members. A vertical plate 46 is welded or attached by other suitable means to the outer surface of the working shank 12 and to the underneath surface of plate 42 and forms an abutting position for the central ends of springs 60 and 62. A sleeve 56 is secured to the front side 52 of vertical member 46 and sleeve 58 is secured to the rear side 54 of member 46 to seat the ends of the respective springs in their illustrated positions. Plate members 48, 50, 64 and 66 all are attached between the sides of the working member 12 and the sides 52 and 54 of the vertical plate 46 to hold the plate 46 in place.

It should be recognized that the spring installation illustrated in FIG. 1 merely shows the installation for one side of the vibrating ripper. It being understood that the same exact structure is also present on the other side of the vibrating ripper. The rearward end of spring 62 is held in place by an abutment 96 that is secured to the side of the support shank 10. Plates 92 and 94 function to support the abutment member 96. A sleeve 98 is secured to the front surface 100 of abutment 96 for seating and positioning the rear end of member 62.

The forward end of spring 60 is held by an assembly on the variable pitch bracket 18, which assembly comprises an abutment 84 and support plates 80 and 82, all of which are secured to the side of the variable pitch bracket 18. A sleeve 78 is secured to the rear surface 83 of abutment 84 and has an inner slidably positioned member 90 with a sleeve for seating the forward end of spring 60. Member 90 has an aperture 93 for coacting with the end of bolt member 86 that is threaded through lock nut 88 and through the threaded aperture in the abutment 84. Thus the compression force of spring 60 may be selectively adjusted by turning bolt member 86. It should also be recognized that any increase of the compression force of spring 60 by moving the sleeve member 91 in a rearward direction will in turn increase the space 32 between the working shank 12 and the variable pitch bracket 18 and will decrease the space 148 between the working shank 12 and the support shank 10. This will in turn increase the compression force on the spring member 62.

The support shank 10 and the variable pitch bracket 18 are secured together by a pair of drawbar plates 20 and 21. The variable pitch bracket 18 extends forward beyond the two drawbar plates 20 and 21 to provide the means for hitching to a prime mover. The upwardly projecting member 19, having an aperture 121 therein, provides a connection to a prime mover having a hydraulic lift linkage that connects thereto and positions the vibrating ripper structure vertically relative to material. This aids in the operative positioning of the vibrating ripper structure and utilizes well known connections that are available on most of the known prime movers. The drawbar plates 20 and 21 are secured to the variable pitch bracket 18 by bolts 122 and to the support shank 10 by bolts 124. It should be understood that an identical drawbar plate 21 is secured to the other side of the vibrating ripper unit, see FIGS. 2 and 4, by the other end of bolts 122 and 124.

Figure 2:
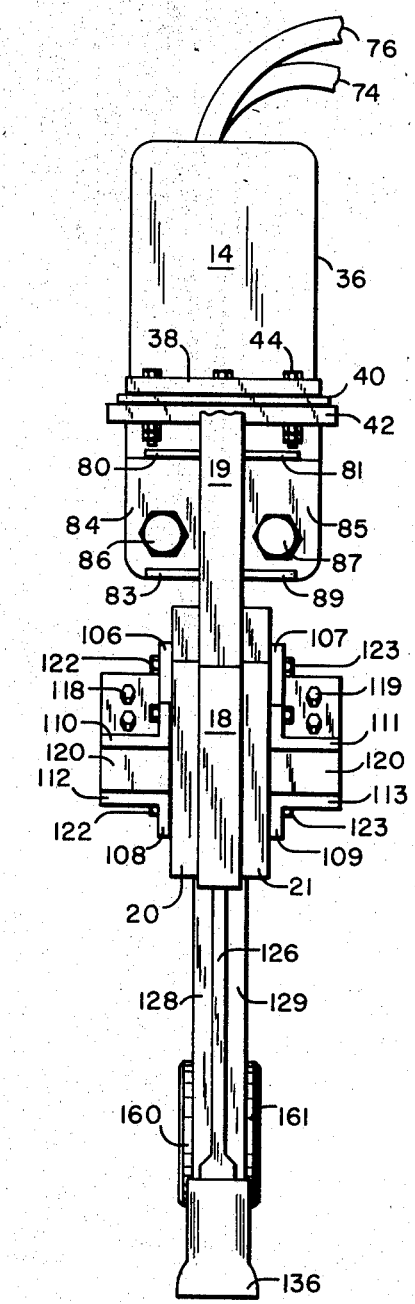
FIG. 2 is a front view of an embodiment of my invention.

The drawbar plates function to maintain a rigid support between the variable pitch bracket 18 and the support shank 10 so that pull on the variable pitch bracket 18 by the prime mover exerts pulling force directly on the support shank 10. This leaves the working shank 12 free to vibrate in the manner that will be described in more detail hereinafter. To prevent twisting of the ripper unit and specifically the drawbar plates 20 and 21, additional support means are provided. Referring to FIGS. 1, 2, and 4 a pair of longitudinal beam members 106 and 108 are secured by welding or other suitable attachment means to the drawbar plate 20 and longitudinal members 107 and 109 are secured to the side of drawbar plate 21 in the similar manner. Each longitudinal member has outwardly directed flanges 110, 112, 111, and 113. These outwardly directed flange members are secured by bolts 116, 118, and 119 to the ends of keys 114 and 120 that respectively pass through aligned slots in the drawbar plates and the supporting shank 10 and the drawbar plates and the variable pitch bracket 18. The key slots 131 for receiving keys 114 and 120 are machined to have a size such that these members fit flush in the slots and thus there is little or no movement therein.

The lower front surface of the working shank 12 curves outwardly and downwardly to a point 22 forming a cutting surface that prys and breaks the soil in the ripping action. The point 138 of the working shank 12 has an attached point 136 secured thereto by a pin 140 that passes through the entire structure. The rearward edge 170 of the attached point 136 abuts against two protecting shields 128 and 129 that are welded into an integral unit with the breaker bar 126. The breaker bar 126 is slotted at 145 to fit the slot 144 in the working shank 12. Pins 132 pass through the working shank 12 and the two protecting shields 128 and 129 holding the structure in position.

A pair of protecting earth shields 130 and 132 are also secured to the side of the working shank 12 by welding or the like, and extend on each side of the working shank 12 in an overlapping position over the sides of the support shank 10. The front edge surface 146 of the protecting earth shields 130 and 131 substantially abut the rearward edge of the protecting shields 128 and 129. Shields 130 and 131 function to prevent the accumulation of dirt in the space 148 between the support shank 10 and the working shank 12 and are connected to the sleeve bearing 16. Thus the working shank 12, the breaker bar 126, the point 136, the protecting shields 128 and 129 and the earth protecting shields 130 and 131 are joined in an integral unit that contains the sleeve bearing 16 that is inserted through both of the earth protecting shields 130 and 131 and through a circular aperture in the lower portion of the support shank 10.

Figure 3:
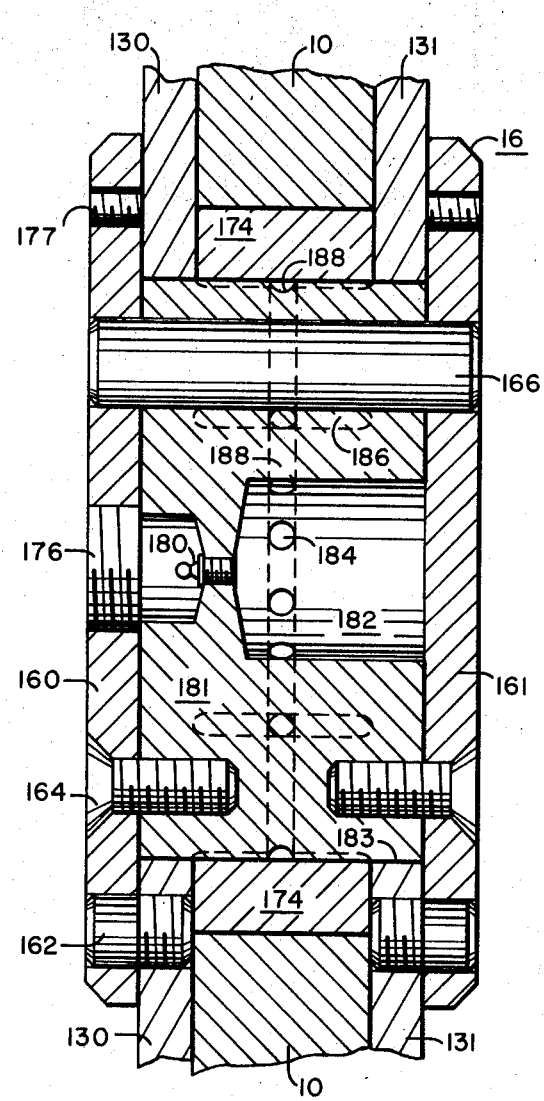
FIG. 3 is a cross section of the bearing used in the specific embodiment of my invention.

Referring now to FIGS. 1 and 3, the sleeve bearing comprises a pair of side plates 160 and 161 that overlap the circular openings in the earth protecting shields 130 and 131 and are secured thereto by threaded pins 162. The side plates 160 and 161 also house an inner sleeve 181, all of which are secured together by screws 164. A cased bearing ring 174 is secured to the inner circular surface of the circular opening in the supporting shank 10 and the inner surface of the bearing ring 174 forms a working bearing surface 183 with the outer surface of the inner sleeve 181. A cover plug 176 provides access to a well known grease fitting 180 through which grease is inserted to a grease pocket 182. Apertures 184 pass the grease to channels 188 that through a plurality of radially positioned channels 186 dispense the grease to the working bearing surface 183. It should be recognized that the screw connections 162 and 164 secure the members together in a rigid construction and the bearing is thus able to carry considerable force over its normal movement, which is small and may be in the order of only a fraction of an inch. Yet the bearing surface must be able to transmit large forces between the working shank 12 and the support shank 10. Accordingly to provide additional force transmitting means, a plurality of steel pins 166 are inserted through the entire structure. These pins 166 help align the inner members with the outer members and provide an inner drive between the respective parts of the side plates 160 and 161 and the inner sleeve 181. Threaded apertures 177 receive bolts (not shown) that when inserted therein press against the sides of shields 130 and 131 and remove the side plates 160 and 161.

It is desirable that the portions of the protecting earth shields 130 and 131 overlapping the sides of the support shank 10 be closely spaced to the outer surface of the support shank 10. Thus a plurality of shield spacers 156, see FIG. 5, maintain an exact distance relationship between the shields 130 and 131. The shield spacers comprise a sleeve 200 that fits in a slot through the support shank 10 and has a length slightly greater than the thickness of the support shank 10. A spacer screw 157 is inserted through aligned apertures in the earth protecting shields 130 and 131 and hold the protecting shields and the sleeve in a rigid connection. This assures a very small spacing between the shields 130 and 131 and the working shank 10 corresponding to the difference in length of the sleeve 200 and the width of the support shank 10. Also since there is relative movement between the earth protecting shields 130 and 131 and the working shank 10 as when the working shank 12 is pivoted on bearing 16 relative to the support shank 10, the slots 158 and 168 in the support shank, as illustrated in phantom, are so directed for movement of the sleeves 200 therein during respective movement of the working shank 12.

Grease fittings such as zirk fittings or the like (not shown) allow grease to be inserted between the inner surfaces of the drawbar plates 20 and 21 and the adjacent outer surfaces of the working shank 12 to reduce power loss in the unit from friction therebetween.

OPERATION

In operation the ripper as previously stated is normally buried below the surface of the material to be ripped to a depth substantially corresponding to the dash line A as illustrated in FIG. 1. The motor of the vibrator mechanism 14 is energized and the prime mover pulls or forces the vibrating ripper through the material. The vibrator mechanism 14 through its horizontal movement causes a rotational movement of the working shank 12 around the pivot point 126 of the sleeve member 16. Accordingly, a rearward horizontal movement of the vibrating unit 14 causes the working shank 12 to be oscillated from its neutral or central position in a counterclockwise direction on bearing 16 and thereby cause the point 22 of the working shank 12 to impart a vertical upward force to the material situated directly above it, creating a pry out force. When the vibrator mechanism 14 provides a movement or force in the forward horizontal direction, then the working shank 12 is pivoted in a clockwise direction around the bearing member 16 thereby causing the point 22 to move downward into the earth and causes the leading or penetrating edge 24 of the working shank 12 to cut into the material. This rapid oscillating motion along the forward portion of the working shank 12 creates a very rapid vibration cutting and prying force that effectively rips the earth or material and moves it toward the surface.

The pairs of balancing and centering spring members 60 and 62 on each side of the vibration ripper center the working shank 12 in a substantially vertical position in the manner previously described. While the vibration of the working shank 12 creates a very large stabilizing force that tends to hold the working shank 12 in the central, vertical position relative to the support shank 10 and the variable pitch bracket 18, the force of the forward pull against the material exerted on the working shank 12 tends to rotate the working shank 12 in a clockwise direction. This follows because the forces on point 22 tending to cause the working shank 12 to be pivoted in a clockwise direction are larger than the force of the earth or material on the breaker bar 126 throughout its vertical surface that tends to cause the working shank 12 to rotate in the opposite counterclockwise direction. Thus, the forward pull on the operating drawbar tends to cause the operating shank to move in a clockwise direction around the bearing point 26 and keeps the unit in the ground along the line A. It may be understood that the bearing member 16 or the bearing point 26 is so positioned on a line between the working shank point 22 and the breaker bar 126 to effectively produce the above described force relationships.

Normally the rear spring 62 functions to keep the operating shank in balance, that is with a given spaced position from the support shank 10 both in operating and nonoperating condition. Compression on the balance spring 62 is set by increasing the compression on the forward spring 60 through adjustment screw 86 until the desired spacing between the support shank 10 and the working shank 12 is achieved. In operation, the operating shank tends to move forward or in a clockwise direction and against the compression of the forward spring 60. This tends to relieve the compression force to a certain extent on the rear spring 62 that now becomes a balanced compression spring. However the rear compression spring 62 always has sufficient force to prevent the upper portion of the upper working shank 12 from contacting the support shank 10. The forward spring 60 exerts sufficient force to counter act the normally larger counterclockwise force of the working shank 12 around the bearing member 16 to maintain the desired spacing between the forward edge of the working shank 12 and the rear edge of the variable pitch bracket 18.

I claim:
1. In a vibrating ripper for being moved in a forward direction:
   a support shank capable of being rigidly secured to a drawbar means;
   an operating shank being positioned forward of said support shank and being pivotally connected at its lower portion to said support shank;
   vibrating means secured to said operating shank for imparting a vibrating motion to said operating shank;
   resilient means interconnecting said support shank and said operating shank for resiliently spacing said support shank and said operating shank;
   bracket means rigidly secured to said drawbar means forward of said operating shank for hitching said ripper to a prime mover;
   aligned abutment means secured to said bracket means and said support shank and said operating shank;
   first spring means positioned between said abutment means secured to said bracket means and said operating shank for maintaining a given intermediate minimum spacing therebetween; and
   second spring means positioned between said abutment means secured to said operative shank and said support shank for maintaining a given minimum spacing therebetween.

2. In a vibrating ripper according to claim 1 including, adjustment means for selectively adjusting the compression of said first spring means.

3. In a vibrating ripper for being moved in a forward direction:
   a support shank capable of being rigidly secured to a drawbar means;
   an operating shank being positioned forward of said support shank and being pivotally connected at its lower portion to said support shank;
   vibrating means secured to said operating shank for imparting a vibrating motion to said operating shank;

resilient means interconnecting said support shank and said operating shank for resiliently spacing said support shank and said operating shank;

said operating shank having a forward and downwardly curved projecting portion at the lower end for contacting the material to be ripped;

said pivotal connection having bearing means with an axis perpendicular to said operating shank and said support shank;

said bearing means comprising a ring bearing secured to an opening in said support shank; and an inner sleeve bearing fitting inside of said ring bearing with its outer sides being secured to said operating shank.

4. In a vibrating ripper for being moved in a forward direction:

a support shank capable of being rigidly secured to a drawbar means;

an operating shank being positioned forward of said support shank and being pivotally connected at its lower portion to said support shank;

vibrating means secured to said operating shank for imparting a vibrating motion to said operating shank;

resilient means interconnecting said support shank and said operating shank for resiliently spacing said support shank and said operating shank;

said operating shank having a forward and downwardly curved projecting portion at the lower end for contacting the material to be ripped;

said pivotal connection having bearing means with an axis perpendicular to said operating shank and said support shank;

said operating shank having a lower rearwardly projecting portion for being pivotally connected to said support shank by said pivotal connection; and said pivotal connection being vertically positioned between the upper and lower ends of said curved portion.

5. In a vibrating ripper according to claim 4 in which said lower rearwardly projecting portion comprising a pair of side plates that fit adjacent each side of said support shank.

6. In a vibrating ripper according to claim 5 in which spacer means interconnects each of said side plates and projects through slots in said support shank for holding said side plates to a given spacing from said support shank.

7. In a vibrating ripper for being moved in a forward direction:

a support shank capable of being rigidly secured to a drawbar means;

an operating shank being positioned forward of said support shank and being pivotally connected at its lower portion to said support shank;

vibrating means secured to said operating shank for imparting a vibrating motion to said operating shank;

resilient means interconnecting said support shank and said operating shank for resiliently spacing said support shank and said operating shank;

said drawbar means comprises a pair of plates with one plate being secured to each side of said support shank and said pair of plates project forward with said operating shank slidably positioned therebetween;

bracket means rigidly secured to said drawbar means forward of said operating shank for hitching said ripper to a prime mover;

a pair of longitudinal members being fixed in spaced aligned position to the outer surface of each of said plates;

key slots extending through said plates and through said support shank and said bracket means; and keys being positioned in said slots and being connected at either end to said longitudinal members.

8. A vibrating ripper mechanism for ripping a material comprising:

a support having means for attachment to a moving device;

a fixed support shank depending from said support;

an operating shank having a pivotal connection to the lower end of said support shank;

said operating shank being spaced forwardly of said support shank and having an elongated working surface for penetrating the material in forward movement in the material, a portion of which working surface extends above said pivotal connection;

said operating shank and said support shank having upper adjacent ends that are spaced from each other;

vibrating means for vibrating said operating shank in pivotal movement on said pivotal connection; and said resilient means interconnecting said operating shank and said support shank adjacent said upper ends and across said space therebetween for resiliently spacing said shanks during said pivotal movement.

9. A vibrating ripper mechanism as claimed in claim 8 wherein said working surface having sufficient elongated length to extend upwardly in normal operation to at least the upper surface of the material to be ripped.

10. A vibrating ripper mechanism as claimed in claim 8 wherein said working surface extends from below said pivotal connection upwardly with sufficient length to extend in normal operation to at least the surface of the material to be ripped.

11. A vibrating ripper mechanism as claimed in claim 8 wherein said vibrating means comprises a vibrator mounted on the upper end of said operating shank for providing a front to rear direction of vibratory motion.

12. A vibrating ripper mechanism as claimed in claim 8 wherein said working surface is on the side of said operating shank that is opposite the side adjacent to said supporting shank, and said working surface has a penetrating edge that extends from a point below the axis of said pivotal connection for a substantial distance above said pivotal connection.

13. A vibrating ripper mechanism as claimed in claim 12 wherein said penetrating edge is inclined forward in the downward direction from a point above said pivotal connection to the lower end of said edge.

14. A vibrating ripper mechanism as claimed in claim 13 wherein said vibrating means comprises a vibrator mounted on the upper end of said operating shank for providing a front to rear direction of vibrator motion, whereby said lower end of said edge is vibrated in an up and down direction and the upper end of said edge is vibrated in a front to rear direction.